April 10, 1934.　　A. C. WILCOX　　1,954,551
COOKING UTENSIL
Filed Aug. 9, 1932　　2 Sheets-Sheet 1

Inventor
Albert C. Wilcox,
Attorney

April 10, 1934. A. C. WILCOX 1,954,551
COOKING UTENSIL
Filed Aug. 9, 1932 2 Sheets-Sheet 2

Inventor
Albert C. Wilcox,
By Carroll Bailey
Attorney

Patented Apr. 10, 1934

1,954,551

UNITED STATES PATENT OFFICE 1,954,551

COOKING UTENSIL

Albert C. Wilcox, Bridgeport, Ohio

Application August 9, 1932, Serial No. 628,073

9 Claims. (Cl. 219—43)

This invention relates to cooking utensils of the self-contained electrical heater type to be used for boiling water and other liquids for general utility and cooking purposes and for the brewing of beverages such as coffee, tea and the like, and has generally in view to provide a utensil of this character possessing various desirable and improved features both from an economical and facile production standpoint and from the standpoint of affording long, efficient service.

A particularly important object of the invention is to provide, in a cooking utensil of the self-contained electrical heater type, novel means for automatically opening the electrical heater circuit at a predetermined time, thus automatically to stop the cooking or brewing operation. According to the invention this means operates in response to a decrease in the liquid content of a liquid receptacle element of the utensil, discharge of liquid from which occurs as a result of heating of the liquid.

Another important object of the invention is to provide a cooking utensil of the character mentioned which is of simple, compact construction and in which all unnecessary loose parts are avoided, but which satisfies the requirement that such elements of the utensil as may require cleansing from time to time are readily separable for this purpose.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views.

Figure 1:
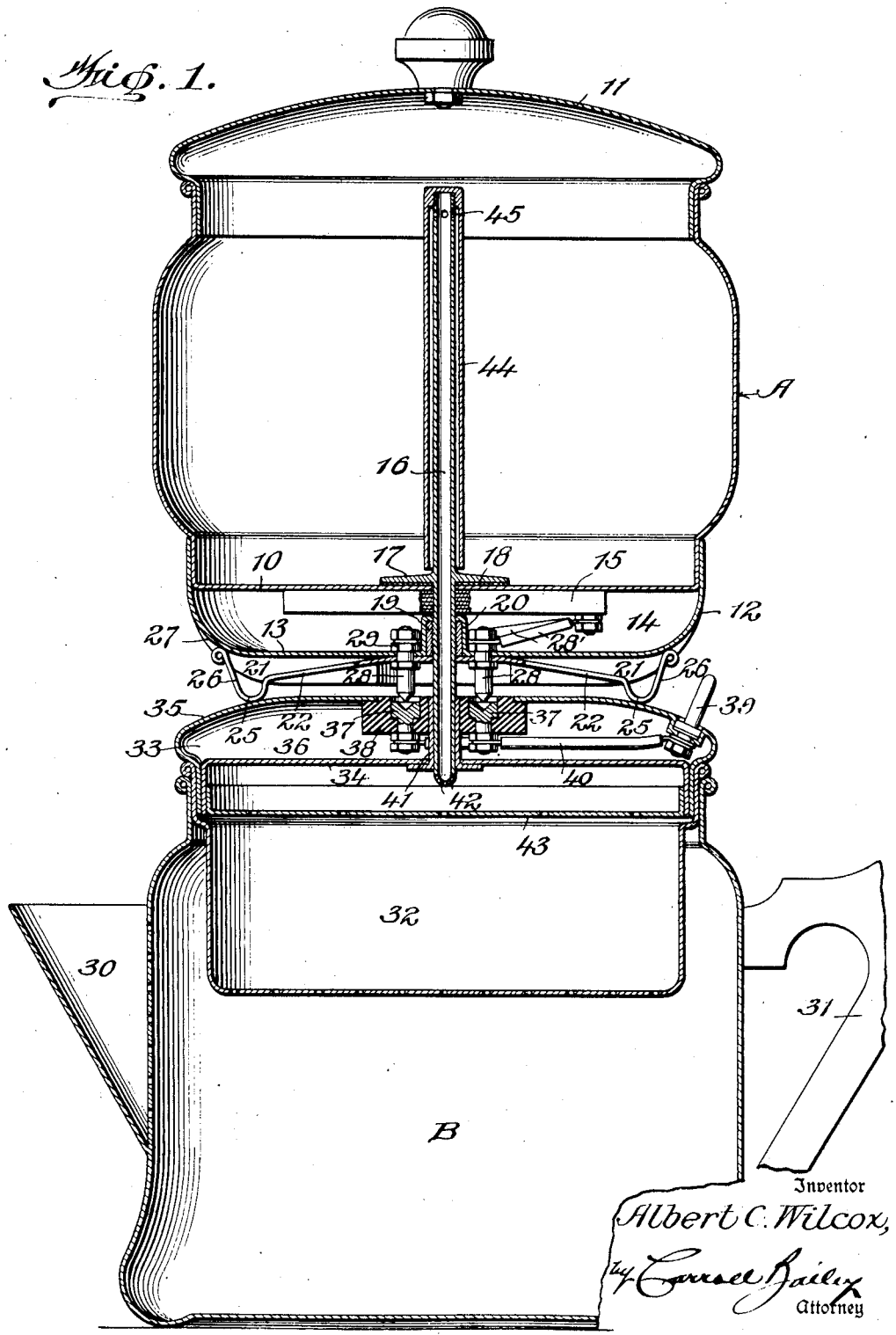
Figure 1 is a view in central, vertical section illustrating the features of the invention embodied in a cooking utensil of the type employed for brewing drip coffee.

Referring to the drawings in detail, it will be observed that the present cooking utensil, according to both illustrated embodiments thereof, is inclusive of two main parts; viz., a receptacle for liquid, designated generally as A, and a base, designated generally as B.

The utensil illustrated in Figures 1 to 3, although capable of being used for various different cooking or brewing purposes, is primarily intended and adapted for making drip coffee and will first be described in detail.

The receptacle A may be of any suitable size and shape and is closed at its bottom, as at 10, and open at its top. A removable closure 11 is provided for the top thereof and this closure is formed to tightly fit the receptacle to prevent loss of pressure generated by the formation of steam therein.

Separate from, but constituting in effect part of the receptacle A, is a dish-like element 12 which fits over the bottom portion of the receptacle and is retained thereon either frictionally or in any other suitable manner. The bottom 13 of this element 12 is spaced below the bottom 10 of the receptacle so that a closed chamber 14 is provided at the bottom of the receptacle. Mounted in any suitable manner within this chamber, preferably against the bottom 10 of the receptacle, is an electrical heating element 15 of any suitable or preferred type.

A vertical tube 16 extends from a point near the top of the receptacle downwardly through a central opening in the bottom wall 10 thereof, through the chamber 14 and the bottom wall 13 of the element 12 and terminates at its lower end a suitable distance below the element 12. Between an integral flange 17 on said tube and the upper face of the bottom wall 10 of the receptacle A is interposed a gasket 18, and the flange is secured to said bottom wall in any suitable manner whereby the tube 16 is maintained in rigid assembly with the receptacle and whereby a liquid tight joint is provided at the point where the tube extends through the bottom wall 10. Obviously the gasket 18 may be eliminated if desired and the flange 17 may be secured directly to the bottom 10 of the receptacle either by soldering or in any other suitable or desired manner. Moreover, while the element 12 may be frictionally or otherwise retained on the bottom of the receptacle A, a positive securing means preferably is provided as illustrated in Figure 1 of the drawings. That is to say, a nut 19 is threaded on the tube 16 and engages a bottom portion of the element 12, the bottom 13 being formed in the present instance with a pocket 20 for the reception of the nut 19 so that the bottom of the nut is disposed either flush with or above the bottom of said element 12, thus providing for compactness in the assembly of the element 12 with the receptacle A.

Figure 2:
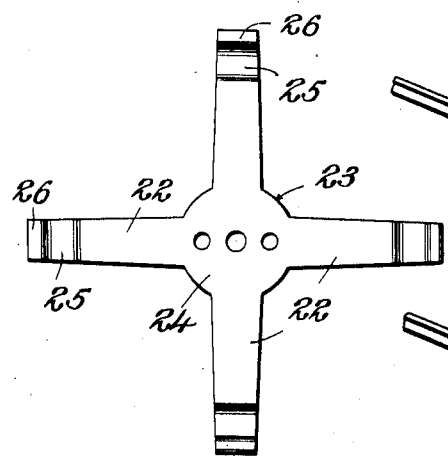
Figure 2 is a plan view of the yieldable supporting element for the receptacle.

Preferably, but not necessarily, the bottom of the element 12 is formed with a plurality of downwardly opening radial depressions 21 each for the accommodation of one of the arms 22 of a plural armed spring spider illustrated in detail in Figures 1 and 2 and designated generally as 23.

The central portion 24 of the spring spider is disposed against the bottom wall of the element 12 and the arms 22 of said spider extend downwardly and outwardly from said central portion 24 in spaced relationship to the closed tops of the depressions 21 in which they are respectively disposed. At their outer ends the arms 22 are provided with U-shaped formations 25 the terminals of the upwardly directed outer legs or arms 26 of which seat against upwardly and outwardly flaring side portions 27 of the element 12.

A pair of contact posts 28 extend through the central portion of the spider 23 and through the bottom 13 of the element 12, one to either side of the tube 16, and are suitably insulated from the spider and the element 12. By means of nuts 29 on said contact posts the spider 23 is secured firmly to the element 12 thus to constitute in effect part of the receptacle A.

The contact posts 28 extend a suitable distance below the element 12 and within the chamber 14 they are respectively connected with the terminals of the heating element 15 by conductors designated as 28'.

The base B of the utensil illustrated in Figure 1 is in the form of a container for liquid, and is provided at one side with a pouring spout 30 and at its other side with a handle 31. Said base or container is open at its top and a perforated cup-like holder 32 for ground coffee, tea leaves or the like is provided to fit within and to be supported by the top of said base or container.

An inverted dish-like element 33 is formed to snugly engage within the open top of the holder 32 and has fitted therein a plate 34 which is spaced from the top 35 of said element 33 thus to provide a closed chamber 36.

The element 33 together with the holder 32 constitutes a closure for the top of the base or container B of the receptacle, and within the chamber 36 of said closure is suitably mounted a pair of contacts 37 which are exposed at their upper ends through the top 35 of the element 33 for cooperation with the receptacle contact posts 28. In the present instance a block of insulation 38 is suitably secured to the top wall 35 of the element 33 within the chamber 36 and has the contacts 37 embedded therein, whereby they are insulated from each other and from the base closure structure.

The invention contemplates supply of operating current for the heating element 15 through an ordinary extension cord, and to this end the wall of the element 33 has circuit continuing pins 39 mounted therein and suitably exposed to be received within the usual pin sockets of an ordinary extension cord fixture. The pins 39 are connected by conductors 40 with the contacts 37, it being understood in this connection that there are two of the contact pins 39 although only one is shown.

Extending centrally through the base closure and the insulation 38 is a sleeve 41 which is flanged outwardly against the under side of the plate 34 and thus assists in retaining said plate within the element 33. The receptacle A is to be supported on the element 33 and the sleeve 41 is provided to permit the lower end portion of the tube 16 to extend downwardly through the element 33 to a point below the plate 34, the lower end of said tube being provided with a semi-spherical end having a plurality of small apertures 42 for directing water or other liquid flowing downwardly through said tube outwardly over a perforated spreader plate 43 disposed below the plate 34 and above or over the holder 32. The spreader plate may have an upwardly directed marginal flange fitting within a downwardly directed marginal flange on the plate 34, or said plate 43 may be secured with respect to the plate 34 in any other suitable or desired manner. In fact, said spreader plate is not essential and may be eliminated, but it preferably is provided for the purpose of effecting a spreading of the water or other liquid flowing downwardly through the tube 16, over the ground coffee or other contents of the holder 32.

Within the receptacle A and surrounding the portion of the tube 16 disposed within said receptacle is a somewhat larger tube 44 which is closed at its upper end and threaded or otherwise mounted, preferably removably, on the upper end of the tube 16 so as to close the upper end thereof. The tube 44 terminates at its lower end a slight distance above the bottom 10 of the receptacle and one or more openings 45 formed through the tube 16 near its upper end provide communication between said tube and the inside of the tube 44. The tubes 16, 44 thus cooperate to provide a siphon connection between the receptacle A and the base or container B, which siphon connection obviously is effective, once it is started operated, to drain the liquid contents of the receptacle A into the base or container B.

The receptacle A is to be yieldably supported on the base B by the spring spider 23 as illustrated in Figure 1, i. e., with the U-shaped formations 25 of the spider engaging the top 35 of the element 33. In this connection the force necessary to flex the spring arms 22 of the spider is so predetermined that when the receptacle A is empty the weight thereof is insufficient to overcome the spring resistance of the spider and the receptacle A therefore is yieldably supported in an elevated position relative to the base B in which the contacts 28 are spaced from the contacts 37. On the other hand, the strength of the spring spider is such as to be overcome by the weight of a predetermined quantity of liquid supplied to the receptacle A. For example, the strength of the spider may be such as to be overcome by the weight of two cups or more of liquid supplied to the receptacle. Thus, assuming the supply of two cups or more of liquid to the receptacle, it is manifest that the same will move downwardly against the restraining effort of the spring spider with consequent engagement of the contacts 28 with the contacts 37.

Normally the siphon connection between the receptacle A and the base B is inactive, but upon closing of the switch constituted by the respective pairs of contacts 28, 37 the heating element circuit is closed and the liquid within the receptacle A is heated. Upon vaporization of the liquid contents of said receptacle pressure is generated therein with the result that the liquid is forced upwardly through the space between the tubes 16 and 44 until eventually a flow of liquid is started through the openings 45 and downwardly through the tube 16. When this flow of hot liquid starts it obviously continues until the receptacle A is substantially emptied, and when, during flow of liquid from said receptacle, the combined weight of the receptacle and the liquid remaining therein becomes so reduced as no longer to exceed the strength of the spring spider, the latter operates to lift the receptacle and disengage the contacts 28 from the contacts 37, thus automatically opening the heating element circuit. In other words, while manual initiation of operation of the utensil is essential, it is manifest that the cooking or brewing operation is automatically stopped after the lapse of a period of time depending upon the capacity of the heating element 15 and the amount of liquid supplied to the receptacle A, the water or other liquid within said receptacle always being raised to a boiling or substantially boiling temperature before the heating element circuit is opened.

Obviously the construction illustrated may be modified in various respects. For example, a coil spring or springs or any other type of yieldable supporting means may be provided for the receptacle A and any other suitable type of circuit controlling switch may be provided in lieu of the switch comprised by the contacts 28, 37.

Figure 3:
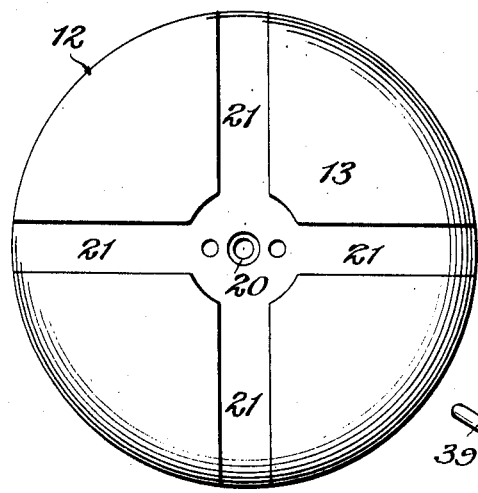
Figure 3 is a bottom view of the heating element housing shell illustrated in Figure 1.
Figure 4:
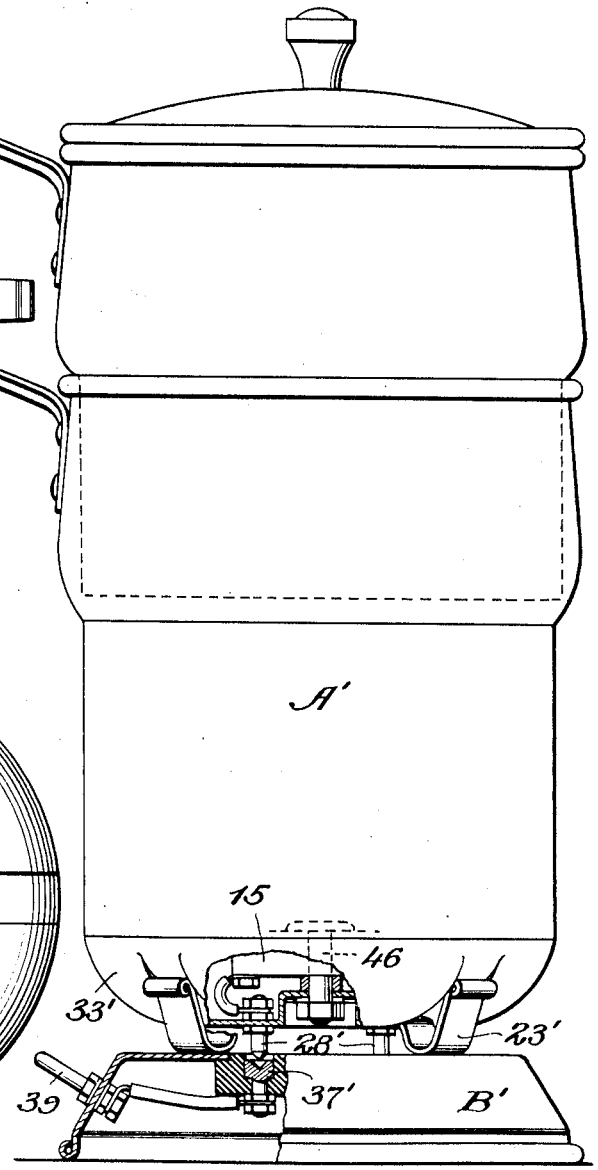
Figure 4 is a side elevation, partly in section, illustrating the features of the invention embodied in a cooking utensil of the double boiler type.

Referring now to the double boiler utensil illustrated in Figure 4 of the drawings, it will be observed that the construction as regards the yieldable support of the receptacle A' and the circuit controlling switch arrangement is substantially the same as illustrated in Figures 1 to 3, the main feature of difference between the two constructions being that the base B' of the construction illustrated in Figure 4 is not in the form of a receptacle, but simply constitutes a support for the receptacle and a housing for the contacts 37' and their connections with the pins 39', and that the siphon tube is eliminated, dependence being placed in the loss of liquid from the receptacle A' by vaporization to reduce the weight of the receptacle sufficiently to permit the spring supporting means 23' therefor to elevate the same to disengage the contacts 28' from the contacts 37'. According to the construction illustrated in Figure 4 the housing 33' for the electrical heating element 15' and its connections is secured to the bottom of the receptacle by a bolt 46.

According to either of the constructions illustrated, the spring 23 or 23' or its equivalent obviously may be carried by the base B or B' instead of by the receptacle A or A'.

From the foregoing description considered in connection with the drawings it is believed that the construction, operation and advantages of the invention will be clearly understood. It is desired to point out, however, that while specific, practical embodiments of the invention have been illustrated the invention may readily be embodied in various other mechanical structures within the spirit and scope of the invention as defined in the appended claims.

I claim:

1. A cooking utensil of the self-contained electrical heater type comprising a base in the form of a container for liquid, a receptacle for liquid, electrical heating means for said receptacle including a circuit controlling switch constructed and arranged to be closed by downward movement of the receptacle relative to the base and to be opened by upward movement of the receptacle relative to the base, yieldable means normally supporting the receptacle on the base in a position with the switch open, said yieldable means being of a strength to be overcome by the weight of a predetermined quantity of liquid supplied to the receptacle whereby the supply of a predetermined quantity of liquid to the receptacle moves the same downwardly to a position to close said switch, and means whereby heating of the liquid within the receptacle effects discharge of the same into the base thus to permit raising of the receptacle by its yieldable supporting means and consequent opening of the switch.

2. A cooking utensil of the self-contained electrical heater type comprising a base in the form of a container for liquid, a receptacle for liquid, electrical heating means for said receptacle including a heating element carried by the receptacle and a circuit controlling switch, the switch comprising cooperating contact elements carried by the receptacle and the base, respectively, yieldable means supporting the receptacle on the base and maintaining the contact elements normally spaced apart, said yieldable means being of a strength to be overcome by the weight of a predetermined quantity of liquid supplied to the receptacle whereby the supply of a predetermined quantity of liquid to the receptacle moves the same downwardly to a position to cause said contacts to engage each other and close the heating element circuit, and means whereby heating of the liquid in the receptacle causes the liquid to be discharged therefrom into the base, thus to permit the receptacle to be raised by said yieldable means with consequent separation of the contacts and opening of the circuit.

3. A cooking utensil of the self-contained electrical heater type comprising a base in the form of a container for liquid, a receptacle for liquid, electrical heating means for said receptacle including a circuit controlling switch constructed and arranged to be closed by downward movement of the receptacle relative to the base and to be opened by upward movement of the receptacle relative to the base, yieldable means normally supporting the receptacle on the base in a position with the switch open, said yieldable means being of a strength to be overcome by the weight of a predetermined quantity of liquid supplied to the receptacle whereby the supply of a predetermined quantity of liquid to the receptacle moves the same downwardly to a position to close said switch, and a normally inactive siphon for effecting discharge of liquid from the receptacle into the base, said siphon being constructed and arranged to have operation thereof initiated by pressure generated within the receptacle by heating of the liquid therein.

4. A cooking utensil of the self-contained electrical heater type comprising a base in the form of a container for liquid, a cover for said base having a closed chamber in the top thereof, insulated circuit continuing elements within said chamber and exposed at the top of the cover, other circuit continuing elements carried by the cover and connected with said first mentioned circuit continuing elements and exposed at the side of the cover for connection with an extension cord, a receptacle for liquid, an electrical heating element carried by said receptacle, insulated circuit continuing elements carried by said receptacle and connected with said heating element and exposed at the bottom of the receptacle for cooperation with said first mentioned cover carried circuit continuing elements, yieldable means supporting the receptacle on the cover of the base and maintaining the receptacle carried circuit continuing elements normally spaced from the first mentioned cover carried circuit continuing elements, said yieldable means being of a strength to be overcome by the weight of a predetermined quantity of liquid supplied to the receptacle whereby the supply of a predetermined quantity of liquid to the receptacle moves the same downwardly against said yieldable means to cause the receptacle and base carried circuit continuing elements to engage each other to close the heating element circuit, and a normally inactive siphon for effecting discharge of liquid from the receptacle into the base, said siphon being inclusive of a tube extending from the receptacle through the chamber in the base cover and into the base, said siphon being arranged to have operation thereof initiated by pressure generated within the receptacle by heating of the liquid therein.

5. A cooking utensil of the self-contained electrical heater type comprising a base in the form of a container for liquid, a cover for said base having a closed chamber in the top thereof, insulated circuit continuing elements within said chamber and exposed at the top of the cover, other circuit continuing elements carried by the cover and connected with said first mentioned circuit continuing elements and exposed at the side of the cover for connection with an extension cord, a receptacle for liquid having a closed chamber in the bottom thereof, an electrical heating element within the closed chamber of said receptacle, insulated circuit continuing elements exposed at the bottom of the closed chamber of the receptacle for cooperation with the first mentioned circuit continuing elements carried by the base cover, connections within the closed chamber of the receptacle between the heating element and the related circuit continuing elements, yieldable means supporting the receptacle on the base and maintaining the receptacle carried circuit continuing elements normally spaced from the base cover carried circuit continuing elements, said yieldable means being of a strength to be overcome by the weight of a predetermined quantity of liquid supplied to the receptacle whereby the supply of a predetermined quantity of liquid to the receptacle moves the same downwardly against said yieldable means to cause the receptacle and base cover circuit continuing elements to engage each other to close the heating element circuit, and a normally inactive siphon for effecting discharge of liquid from the receptacle into the base, said siphon being inclusive of a tube extending from the receptacle downwardly through the closed chamber in the bottom thereof and through the chamber in the base cover into the base, said siphon being arranged to have operation thereof initiated by pressure generated within the receptacle by heating of the liquid therein.

6. A cooking utensil of the self-contained electrical heater type comprising a base element, a receptacle element for liquid, a spring spider inclusive of a plurality of spring arms interposed between the bottom of the receptacle element and the top of the base element yieldably supporting the receptacle element on the base element, one of said elements having recesses accommodating the arms of said spring spider, and electrical heating means for the receptacle element including a circuit controlling switch carried in part by the receptacle element and in part by the base element and arranged to be closed by downward movement of the receptacle element against said spring spider and to be opened by upward movement of the receptacle under the influence of the spring spider.

7. A cooking utensil as set forth in claim 1 in which a holder for material is interposed in the path of flow of liquid from the receptacle into the base.

8. A cooking utensil as set forth in claim 4 in which a perforated liquid spreader element is interposed in the path of flow of liquid from the siphon into the base, and in which a container for material is arranged below said spreader element to have the liquid pass therethrough prior to its discharge into the base.

9. A cooking utensil as set forth in claim 4 in which the siphon is rigid with the receptacle and in which the siphon tube extends below the receptacle loosely through an opening in the top of the base into the base.

ALBERT C. WILCOX.